(12) United States Patent
Griffin

(10) Patent No.: US 10,657,479 B2
(45) Date of Patent: May 19, 2020

(54) SYSTEM AND METHOD FOR INTEGRATING EMPLOYEE FEEDBACK WITH AN ELECTRONIC TIME CLOCK OR COMPUTER LOGIN

(71) Applicant: Jamie Griffin, Dallas, TX (US)

(72) Inventor: Jamie Griffin, Dallas, TX (US)

(*) Notice: Subject to any disclaimer, the term of this patent is extended or adjusted under 35 U.S.C. 154(b) by 410 days.

(21) Appl. No.: 15/297,931

(22) Filed: Oct. 19, 2016

(65) Prior Publication Data

US 2017/0116555 A1 Apr. 27, 2017

Related U.S. Application Data

(60) Provisional application No. 62/245,125, filed on Oct. 22, 2015.

(51) Int. Cl.
*G06Q 10/06* (2012.01)
*G06Q 10/10* (2012.01)
*G09B 7/00* (2006.01)

(52) U.S. Cl.
CPC ... *G06Q 10/06393* (2013.01); *G06Q 10/1091* (2013.01); *G09B 7/00* (2013.01); *G06Q 10/105* (2013.01)

(58) Field of Classification Search
CPC . G06Q 10/06393; G06Q 10/1091; G09B 7/00
See application file for complete search history.

(56) References Cited

U.S. PATENT DOCUMENTS

| 6,754,635 | B1 | 6/2004 | Hamlin et al. |
| 7,278,163 | B2 | 10/2007 | Banzhof et al. |
| 8,095,415 | B1* | 1/2012 | Thomas ........... G06Q 10/06393 |
| | | | 705/7.39 |
| 8,655,713 | B2 | 2/2014 | Green et al. |

(Continued)

FOREIGN PATENT DOCUMENTS

| JP | 2002092289 A | 3/2002 | |
| WO | WO-2016063137 A2 * | 4/2016 | ......... H04N 21/4305 |

OTHER PUBLICATIONS

Carole L. Jurkiewicz et. al., When an Employee Leaves: The Effectiveness of Clinician Exit Interviews and Surveys, Mar. 2001, The Journal of Clinicial Leadership and Management Review, pp. 81-84 (Year: 2001).*

*Primary Examiner* — Amanda Gurski
(74) *Attorney, Agent, or Firm* — Kirby Drake

(57) ABSTRACT

A system and method for integrating employee feedback with an electronic time clock or computer login may be used for a variety of reasons including to measure an employee's level of engagement, assess the quality of programming, and seek feedback in how to improve the workplace. Surveying employees in this manner may allow the employer to receive immediate feedback from its employees. It also may allow an opportunity to change or target survey questions based on one or more factors including, but not limited to, time in position, previous answers, level of engagement, and branch/location performance. Data collected may be used to develop predictive analytics that may help the employer to ascertain what percentage of the employee base may remain employed with the employer over a specified period of time or what percentage of the employee base may leave within a specified period of time.

17 Claims, 4 Drawing Sheets

Selecting the Next Question \ Question Bins

| | Engagement | Bins | Sample Question | Notes |
|---|---|---|---|---|
| 201 | New Hire | Initial | • How was your first shift? [7 point scale] | Pre-loaded questions that all employees answer over their first X number of shifts to establish a baseline assessment of employee. This allows time for new employees in the POS or time clock to be integrated into the agile feedback system. |
| 202 | Lowest | Compliance | • My workplace is free of harassment [Yes/No] | If we predict someone may leave us, we may ask questions to assure we've complied with HR policies and procedures to avoid further claims. |
| 203 | Below Average | Recovery | • I intend to look for a new job elsewhere within the next 3 months [7 point scale] | Provides diagnostic and predictive insights on employees whose engagement is low or trending negatively. |
| 204 | Average | Core | • I am happy working for the company [7 point scale] | Provides diagnostic and predictive insights on employees whose engagement is average. |
| 205 | Above Average | Development | • Managers provide me with information about promotions at my branch. [Yes/No] | Provides diagnostic and predictive insights on employees whose engagement is trending positively. Are we doing what we need to do to move them forward? |
| 206 | Highest | Programs | • I am aware of and understand the company's benefits offerings. [7 point scale] | Asks program questions only of the highest engaged employees to avoid negative biases which unengaged Crewmembers may have. |

(56) References Cited

U.S. PATENT DOCUMENTS

| | | | |
|---|---|---|---|
| 2003/0191700 A1* | 10/2003 | Horne | G06Q 10/06311 |
| | | | 705/32 |
| 2005/0021388 A1 | 1/2005 | Hatcher et al. | |
| 2009/0089154 A1 | 4/2009 | Dion | |
| 2009/0327051 A1 | 12/2009 | Nerby | |
| 2010/0100427 A1* | 4/2010 | McKeown | G06Q 10/067 |
| | | | 705/322 |
| 2011/0320230 A1* | 12/2011 | Podgurny | G06Q 10/06 |
| | | | 705/7.13 |
| 2013/0096986 A1 | 4/2013 | Pavagadhi | |
| 2013/0311190 A1 | 11/2013 | Reiner | |
| 2014/0100922 A1* | 4/2014 | Aycock | G06Q 10/0639 |
| | | | 705/7.38 |
| 2014/0162240 A1* | 6/2014 | Wheeler | G09B 7/00 |
| | | | 434/362 |
| 2014/0222512 A1* | 8/2014 | Pace | G06Q 30/0203 |
| | | | 705/7.32 |

* cited by examiner

Selecting the Next Question \ Question Bins

| Engagement | Bins | Sample Question | Notes |
|---|---|---|---|
| New Hire | Initial | • How was your first shift? [7 point scale] | Pre-loaded questions that all employees answer over their first X number of shifts to establish a baseline assessment of employee. This allows time for new employees in the POS or time clock to be integrated into the agile feedback system. |
| Lowest | Compliance | • My workplace is free of harassment [Yes/No] | If we predict someone may leave us, we may ask questions to assure we've complied with HR policies and procedures to avoid further claims. |
| Below Average | Recovery | • I intend to look for a new job elsewhere within the next 3 months [7 point scale] | Provides diagnostic and predictive insights on employees whose engagement is low or trending negatively. |
| Average | Core | • I am happy working for the company [7 point scale] | Provides diagnostic and predictive insights on employees whose engagement is average. |
| Above Average | Development | • Managers provide me with information about promotions at my branch. [Yes/No] | Provides diagnostic and predictive insights on employees whose engagement is trending positively. Are we doing what we need to do to move them forward? |
| Highest | Programs | • I am aware of and understand the company's benefits offerings. [7 point scale] | Asks program questions only of the highest engaged employees to avoid negative biases which unengaged Crewmembers may have. |

*FIG. 2*

Alert Layer

| | | |
|---|---|---|
| 401 → | Alerts to Human Resources | Provide instant and aggregate reports to HR about specific KPI's or warnings. For example, an HR contact may receive an alert if a compliance question is answered negatively (i.e., an employee indicates that harassment is occurring in the restaurant). |
| 402 → | Alerts to Local Management | Provide instant and aggregate reports to Local Management about specific KPI's and opportunities. Who should we work to retain for turnover? Who should we work to develop and promote? How's a new manager doing on their shifts? How's the engagement of the Crew impacting business results? |
| 403 → | Alerts to Regional Management | Same as 402 but on a regional or multi-unit level. |

*FIG. 4*

SYSTEM AND METHOD FOR INTEGRATING EMPLOYEE FEEDBACK WITH AN ELECTRONIC TIME CLOCK OR COMPUTER LOGIN

The present Application is a non-provisional application of and claims priority to U.S. Provisional Application No. 62/245,125 filed Oct. 22, 2015 entitled "System and Method for Integrating Employee Feedback With an Electronic Time Clock or Computer Login" and is incorporated by reference in its entirety.

FIELD OF THE DISCLOSURE

The present disclosure generally relates to employee feedback, and more particularly, integrating employee feedback with an electronic time clock or computer login.

BACKGROUND

According to the National Restaurant Association (NRA), the restaurant industry employs 14.4 million employees (the vast majority of employees being employed on an hourly basis) with 13.2 million of those employees being employed in food preparation & serving. According to the US Bureau of Labor Statistics, hourly workers represent 59% of the overall US workforce. The 2015 Industry NRA forecast identifies several workforce trends: (i) recruiting and retaining employees is a growing challenge to operators, (ii) teen representation in the workforce is shrinking, (iii) labor demographics are changing, and (iv) labor productivity has remained nearly flat since 2003. Restaurant turnover is a staggering 66%, higher in the quick service segment with hourly turnover around 90%. Turnover, perhaps the most lagging people indicator, is the most frequently referenced measure of people. Many businesses use annual employee surveys or customer surveys to gauge feedback on various topics. But with 60% turnover, most employees may never be surveyed. Similar trends hold true for retailers and others in the broader hospitality industry.

SUMMARY

Employers may use employee surveys for a variety of reasons including to measure and improve employees' level of engagement, assess the quality of programming, benchmark results for comparison, and seek feedback in how to improve the workplace. Embodiments of the present disclosure may provide a system and method for employee feedback that may enable employers to frequently survey employees, particularly hourly employees, either at clock/log-in or clock/log-out, such as through an electronic time clock or computer login. The clock/log-in and clock/log-out procedure would not be complete until the employee answers the survey question(s), and in some embodiments of the present disclosure, the time used to survey the employee may be compensable.

Surveying employees according to embodiments of the present disclosure may provide a number of benefits. For example, it may connect an employee's survey responses to an identifier associated with the employee (such as an employee ID number), thereby associating accurate employee demographic data with survey responses. Surveying employees in this manner may allow the employer to receive immediate feedback from its employees, such as on a daily trending basis. It also may allow an opportunity to change or target survey questions based on one or more factors including, but not limited to, an employee's time in position, previous answers, level of engagement, recent events, company programs, and branch/location performance.

Over time, data collected through surveying employees according to embodiments of the present disclosure may be used to develop predictive analytics. Such predictive analytics may help the employer to ascertain what percentage of the employee base may remain employed with the employer over a specified period of time (i.e., 6 months after the survey was completed); determine what percentage of the employee base may leave within a specified period of time (i.e., over the next 4 weeks); or improve forecasts of workforce problems and opportunities to be addressed by the employer. This may be helpful for employers that have a large number of hourly workers, such as in the retail, restaurant and hospitality industries.

In other embodiments of the present disclosure, surveying also may be used with corporate office workers. As with hourly workers, corporate office workers may be surveyed by connecting the worker's corporate network login ID with a once-a-day (or more or less frequent) survey question(s). The survey question(s) may be presented at the beginning of the day when the worker logs into the network in some embodiments of the present disclosure. In other embodiments of the present disclosure, a worker may be required to answer one or more survey questions through a corporate Intranet before he/she begins browsing the Internet on the corporate network. In further embodiments of the present disclosure, a worker may be prompted to answer one or more survey questions upon log-out at the end of the workday.

Embodiments of the present disclosure may provide a method for integrating employee feedback with an electronic time clock, the method comprising using a unique employee ID, logging into the electronic time clock associated with an organization employing an employee; receiving a prompt to answer one or more survey questions, the one or more survey questions generated based on the unique employee ID; answering the one or more survey questions to provide employee feedback; wherein the employee cannot log out of the electronic time clock until the employee answers each of the one or more survey questions and the answers are recorded.

The log-in may take place at the beginning of the employee's shift. The log-in may take place at the conclusion of the employee's shift. The logging step may occur through the employee inputting the unique employee ID. The logging step may occur through use of a card having an RFID chip or magnetic strip containing the unique employee ID. At least one of the one or more survey questions may be non-variable. The one or more survey questions may be randomly selected. The one or more survey questions may be generated based on the employee's previous answers.

The method may further comprise generating one or more alerts based on answers provided in response to the one or more survey questions; and sending the one or more alerts to one or more persons within the organization associated with the electronic time clock, wherein the one or more alerts may create management action to improve key performance indicators (KPIs) associated with employees in the organization. The one or more alerts may be generated when a particular answer is recorded in response to the one or more survey questions.

The one or more survey questions are selected from one or more bins comprising: an initial bin containing questions directed to new hire engagement, a compliance bin for lowest engagement containing questions directed to compliance with policies and procedures by the organization, a recovery bin containing questions to provide diagnostic and predictive insights as to employees whose engagement may be low or trending negatively, a core bin containing questions to provide diagnostic and predictive insights as to employees whose engagement is average, a development bin containing questions to help the organization to evaluate whether it is doing what it needs to do to move the organization and/or the employee forward, and a programs bin containing questions to be used for employees having the highest engagement to avoid negative biases that unengaged (or less engaged) employees may have. When the answers to the one or more survey questions are trending positive, subsequent survey questions may be selected from the programs bin. When the answers to the one or more survey are trending negative, subsequent survey questions may be selected from the compliance bin. The employee time clock may be part of a point-of-sale system.

The one or more alerts may be sent to one or more layers of the organization, one or more layers comprising: alerts to human resources, alerts to local management, and alerts to regional management, wherein the one or more alerts may be sent to the one or more layers to provide instant and aggregate reports about specific KPIs or warnings. The answers may affect engagement outcomes of the organization by evaluating the level of engagement of employees throughout the organization. The answers may affect compliance outcomes of the organization by providing alerts as to parts of the organization where compliance issues are occurring so that these issues may be promptly addressed. The answers may provide a predictive measure to identify employees to be considered for further development and/or promotion as well as to identify employees likely to leave the organization.

Other embodiments of the present disclosure may provide a method for integrating employee feedback with a computer login by an employee, the method comprising surveying the employee each time that he/she utilizes the computer login, the survey including one or more survey questions directed to the employee and his/her work with an organization; and using answers to the one or more survey questions to receive immediate feedback from the employee about his/her level of engagement with the organization, quality of programming of the organization, and possible improvements to the organization; and changing or targeting subsequent survey questions to the employee based on one or more factors including time in position, answers to previous survey questions, level of engagement, and branch/location performance.

Further embodiments of the present disclosure may provide a system for providing immediate employee feedback about an organization, the system comprising an electronic time clock having a mechanism for an employee to input a unique employee ID, the mechanism selected from the group comprising: a card having an RFID chip containing the unique employee ID, a card having a magnetic strip containing the unique employee ID, and a log-in screen prompting the employee to input the unique employee ID, wherein when the employee may input the unique employee ID, the employee may be prompted to respond to one or more survey questions to provide immediate employee feedback, and wherein the employee cannot log out of the electronic time clock until the employee answers each of the one or more survey questions and the answers are recorded.

BRIEF DESCRIPTION OF THE DRAWINGS

For a more complete understanding of this disclosure, reference is now made to the following description, taken in conjunction with the accompanying drawings, in which:

FIG. 2 depicts a chart that identifies various "bins" that may contain questions that may be directed to a specific area of focus according to an embodiment of the present disclosure;

FIG. 4 depicts alert layers according to an embodiment of the present disclosure.

DETAILED DESCRIPTION

Figure 1:
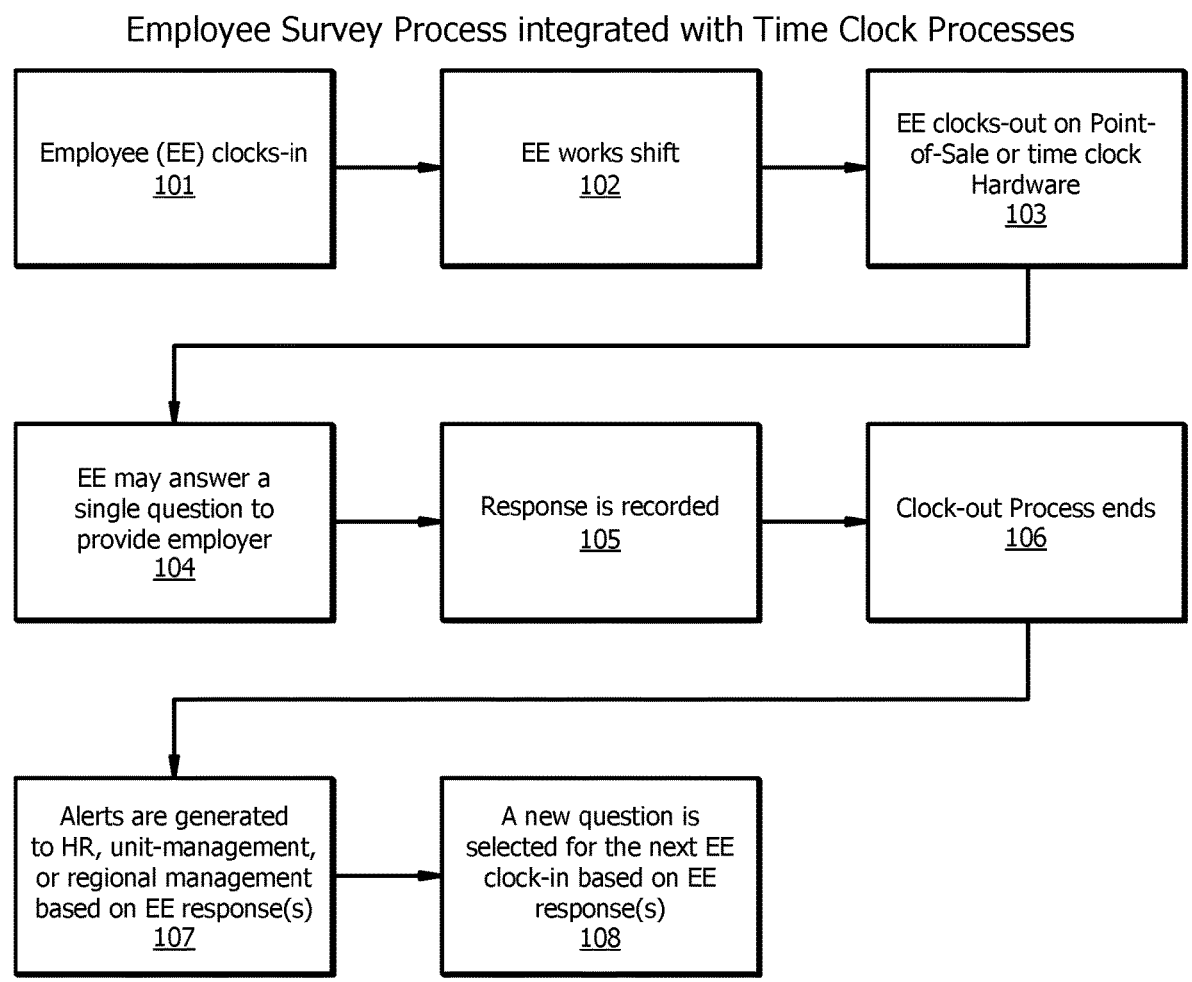
FIG. 1 depicts an employee survey process integrated with time clock processes according to an embodiment of the present disclosure.

FIG. 1 depicts an employee survey process integrated with time clock processes according to an embodiment of the present disclosure. An employee may clock/log into the system (step 101) and then the employee may work his/her shift (step 102). It should be appreciated that the mechanism by which an employee logs/clocks into the system (step 101) may differ depending on whether a time clock or a machine login is employed. In some embodiments of the present disclosure, an employee may clock in using a unique employee ID or the employee may log into a computer network using a unique user name associated with the employee. In other embodiments of the present disclosure, an employee may utilize a card or other similar object having an RFID chip or magnetic strip with a unique employee ID to log into a computer network. The unique employee ID or user name may allow the system to connect survey responses to other employee data, including but not limited to, job title, tenure and rate of pay in some embodiments of the present disclosure. However, other types of identifiers may be utilized without departing from the present disclosure.

At the conclusion of his/her shift, the employee may clock out on a point-of-sale or other time clock hardware or he/she may log out of a computer (step 103). Upon clocking/logging out, the employee may be prompted to answer one or more survey questions for his/her employer (step 104). It should be appreciated that a non-answer to the survey question(s) may be considered a response in some embodiments of the present disclosure. It also should be appreciated that the system may be set up to require the employee to answer one or more non-variable questions each time that he/she clocks/logs out (i.e., the first few questions remain the same each time), but in other embodiments of the present disclosure, the question(s) may vary each time. The employee's response(s) may be recorded (step 105), and the clock/log-out process then ends (step 106).

Alerts may be generated based on an employee's response(s) and sent to one or more persons or entities within the organization, including but not limited to, human resources (HR), unit management, or regional management (step 107). These alerts may be generated with the intent to create management action, and management action may be intended to improve key performance indicators (KPIs) associated with employees in the organization. It should be appreciated that alerts may be sent if a particular response is recorded in some embodiments of the present disclosure; however, there may be other embodiments of the present disclosure where all responses may be sent to an employee's manager on a daily, weekly or monthly basis, depending on the manager's needs.

A new survey question may be selected for the next employee clock/log-in (step 108). It should be appreciated that the new survey question may be randomly selected or it may be selected based on the employee's prior response according to embodiments of the present disclosure. In an embodiment of the present disclosure, the new question(s) may be generated based on the employee's answers to the previous survey question(s). If the answers are trending positive, the system may move to more programmatic questions. On the other hand, if the answers are trending negative, the system may move to compliance-related questions. Questions may be selected/picked up from "bins" or pools of questions related to different areas of focus as discussed further below. It should be appreciated that there may be some embodiments of the present disclosure where an employer may ask each employee the same question(s) (i.e., a question about the quality of benefits enrollment communications); however, there may be other embodiments of the present disclosure wherein different employees or sets of employees may be asked different questions.

FIG. 2 depicts a chart that identifies various "bins" that may contain questions that may be directed to a specific area of focus according to an embodiment of the present disclosure. While sample questions are provided, it should be appreciated that each bin may include the sample question or it may contain one or more different questions without departing from the present disclosure. It also should be appreciated that more or fewer bins may be provided without departing from the present disclosure.

Initial bin (201) may be used in new hire engagement, and a sample question may ask how the employee's first (or current) shift went. In some embodiments of the present disclosure, the employee may be asked to respond to such a question based on a 7-point scale; however, other scales may be provided without departing from the present disclosure. It should be appreciated that each bin described herein may include an array of questions. The response scale and type may depend on the question type within the bin. Responses/scales may include but are not limited to 5-point scale, 7-point scale, yes or no, as well as qualitative scales. Initial bin (201) may include pre-loaded questions that all employees may answer over a specified number of shifts when they begin employment with the organization, and this may establish a baseline assessment of the employees. This also may allow time for new employees that can only access a point-of-sale or time clock at the outset of their employment to be integrated into the employee feedback system according to embodiments of the present disclosure.

Compliance bin (202) may be used for lowest engagement, and a sample question may ask the employee to answer a yes/no question such as "my workplace is free of harassment." Other questions may include but are not limited to "[m]y workplace is free of discrimination" and "I have been paid for all regular and overtime hours worked." This may be helpful in an organization that may predict that an employee may leave the employ of the organization. This type of question also may be asked to ensure that the organization has complied with relevant HR policies and procedures to avoid or at least deal with future claims should they later arise.

Recovery bin (203) may be used for below-average engagement, and a sample question may ask the employee to respond to the statement "I intend to look for a new job elsewhere within the next 3 months" using a 7-point scale. Again, a different scale may be used without departing from the present disclosure. It also should be appreciated that the statement may be rephrased as a yes/no question without departing from the present disclosure. Other questions/statements may include but are not limited to "I am proud to work for my organization" and "I am optimistic about the future of our company." Such questions may provide diagnostic and predictive insights as to employees whose engagement may be low or trending negatively.

Core bin (204) may be used for average engagement, and a sample question may ask the employee to respond to the statement "I am happy working for the company" using a 7-point (or other specified) scale. Other questions/statements may include but are not limited to "[t]he company has lived up to commitments made when hired" and "I feel my decision to join the company was a good one." Such questions may provide diagnostic and predictive insights as to employees whose engagement is average.

Development bin (205) may be used for above-average engagement, and a sample question may ask the employee to respond to the statement "[m]anagers provide me with information about promotions at my branch," and the employee may be prompted to answer "yes" or "no." Such a question may provide diagnostic and predictive insights on employees whose engagement appears to be trending in a positive direction. It may help the organization to evaluate whether it is doing what it needs to do to move the organization and/or the employee forward.

Programs bin (206) may be used for highest engagement, and a sample question may prompt the employee to respond to the statement "I am aware of and understand the company's benefits offerings" using a 7-point (or other specified) scale. Other questions may include but are not limited to "[t]raining programs are effective and prepare me for my role" and "[m]anagers provide me with information about promotions at my branch." These types of questions generally may be used for employees having the highest engagement to avoid negative biases that unengaged (or less engaged) employees may have.

While certain bins (201-206) have been described, it should be appreciated that other bins may be provided in addition to or in lieu of bins that are depicted in FIG. 2. For example, there may be question bins that focus on recognition programs or interest in being promoted in some embodiments of the present disclosure. There also may be bins that are specific to different departments or regions of an organization without departing from the present disclosure.

Figure 3:
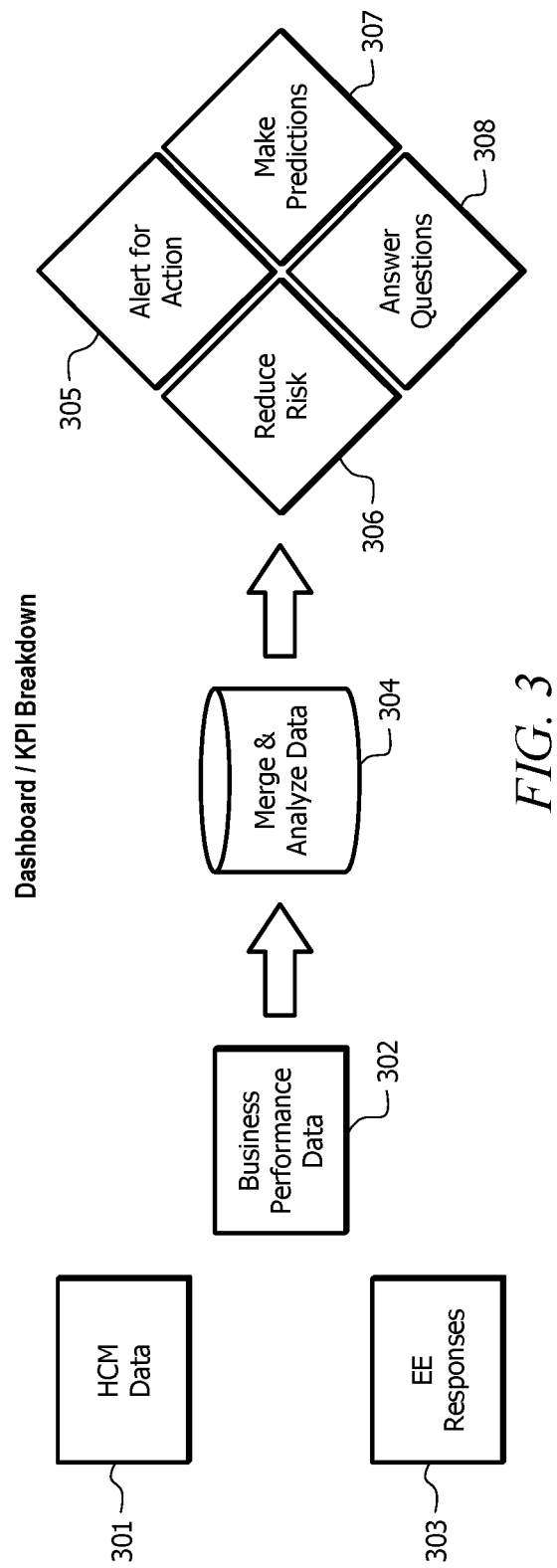
FIG. 3 depicts a dashboard/KPI breakdown according to an embodiment of the present disclosure.

FIG. 3 depicts a dashboard/KPI breakdown for a system according to an embodiment of the present disclosure. It should be appreciated that one or more pieces of data, including but not necessarily limited to, human capital management (HCM) data 301, business performance data 302 and employee responses 303 may be transmitted within the system. These pieces of data may be merged and analyzed 304, and as depicted in FIG. 3, the merged/analyzed data may be used for one or more actions, including but not limited to, alerting for action 305, reducing risk 306, making predictions 307, and answering questions 308.

It should be appreciated that custom software may be built for a point-of-sale or electronic time clock system and may be loaded with initial questions. There may be a file feed from the point-of-sale or electronic time clock that may transmit an employee ID, the question(s) asked and the answer(s) to the question(s). There also may be a file feed from the HCM system that may transmit an employee ID and demographic data. New questions then may be generated and sent back to the point-of-sale or electronic time clock system according to embodiments of the present disclosure. While certain data has been described as being included in a file feed, it should be appreciated that more or fewer pieces of data may be included in a file feed without departing from the present disclosure.

FIG. 4 depicts an alert layer of the system according to an embodiment of the present disclosure. In this embodiment, three alert layers have been depicted; however, more or fewer alert layers may be employed without departing from the present disclosure. Layer 401 may provide alerts to Human Resources (HR). Such alerts may provide instant and aggregate reports to HR with regard to specific KPIs or warnings. For example, an HR contact may receive an alert if a question from the compliance bin is answered negatively (i.e., an employee indicates that harassment is occurring in the workplace). Layer 402 may provide alerts to local management. Such alerts may provide instant and aggregate reports to local management about specific KPIs and opportunities. For example, local management may use such alerts to ascertain which employees the organization should work to retain, develop and/or promote. These alerts also may provide indicators as to how a new manager is doing on his/her shifts and/or how the engagement of employees may be impacting business results. Layer 403 may provide alerts to regional management. Such alerts may be similar to those described with respect to layer 402; however, they may be provided on a regional or multi-unit level in embodiments of the present disclosure.

Systems and methods according to embodiments of the present disclosure may affect outcomes, including but not limited to, engagement, compliance and predictive outcomes. With respect to engagement, receiving employee feedback on a daily basis may allow the organization to evaluate the level of engagement of employees system-wide as well as broken down into sub-groups, thereby allowing the organization to make adjustments that may be helpful to improve engagement. With respect to compliance, employee relations may be provided with alerts as to branches where compliance issues are occurring so that these issues may be promptly addressed. It also may provide the organization with possible defenses to wage and hour claims if the problems can be addressed in real-time (or virtually in real-time). These systems and methods also may provide a predictive measure in that they may provide managers with an identification of employees to be considered for further development and/or promotion. They also may provide managers with an identification of employees who may be likely to leave the organization without intervention by the manager(s).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for integrating employee feedback with an electronic time clock, the method comprising:
    using a unique employee identification (ID), logging into the electronic time clock on a display screen, the electronic time clock associated with an organization employing an employee, the electronic time clock having a mechanism for an employee to input the unique employee ID, the mechanism selected from the group comprising: a card having an RFID chip containing the unique employee ID, a card having a magnetic strip containing the unique employee ID, and a log-in screen prompting the employee to input the unique employee ID,
    receiving a prompt on the display screen where the employee logged into the electronic time clock to answer one or more survey questions, the one or more survey questions generated based on the unique employee ID;
    answering the one or more survey questions on the display screen to provide employee feedback while still logged into the electronic time clock;
    generating one or more alerts when answers provided in response to the one or more survey questions constituting employee feedback integrated with the electronic time clock identify discrimination, harassment, and/or illegal pay practices; and
    sending the one or more alerts to one or more persons within the organization associated with the electronic time clock,
    wherein the employee cannot log out of the electronic time clock until the employee provides answers to each of the one or more survey questions using the display screen and the answers are recorded, and
    wherein the one or more alerts create management action to improve key performance indicators (KPIs) associated with employees in the organization relating to discrimination, harassment, and/or illegal pay practices.

2. The method of claim 1 wherein the logging step takes place at the beginning of the employee's shift.

3. The method of claim 1 wherein the logging step takes place at the conclusion of the employee's shift.

4. The method of claim 1 wherein the logging step occurs through the employee inputting the unique employee ID.

5. The method of claim 1 wherein the logging step occurs through use of a card having an RFID chip or magnetic strip containing the unique employee ID.

6. The method of claim 1 wherein at least one of the one or more survey questions is non-variable.

7. The method of claim 1 wherein the one or more survey questions are randomly selected.

8. The method of claim 1 wherein the one or more survey questions are generated based on the employee's previous answers.

9. The method of claim 1 wherein the one or more survey questions are selected from one or more bins comprising:
    an initial bin containing questions directed to new hire engagement,
    a compliance bin for lowest engagement containing questions directed to compliance with policies and procedures by the organization, a recovery bin containing questions to provide diagnostic and predictive insights as to employees whose engagement may be low or trending negatively, a core bin containing questions to provide diagnostic and predictive insights as to employees whose engagement is average, a development bin containing questions to help the organization to evaluate whether it is doing what it needs to do to move the organization and/or the employee forward, and a programs bin containing questions to be used for employees having the highest engagement to avoid negative biases that unengaged (or less engaged) employees may have.

10. The method of claim 9 wherein when the answers to the one or more survey questions are more positive than negative, subsequent survey questions are selected from the programs bin.

11. The method of claim 9 wherein when the answers to the one or more survey are more negative than positive, subsequent survey questions are selected from the compliance bin.

12. The method of claim 1 wherein the employee time clock is part of a point-of-sale system.

13. The method of claim 1 wherein the one or more alerts are sent to one or more layers of the organization, one or more layers comprising:

alerts to human resources, alerts to local management, and alerts to regional management, wherein the one or more alerts are sent to the one or more layers to provide instant and aggregate reports about specific KPIs or warnings.

14. The method of claim 1 wherein the answers affect engagement outcomes of the organization by evaluating the level of engagement of employees throughout the organization.

15. The method of claim 1 wherein the answers affect compliance outcomes of the organization by providing alerts as to parts of the organization where compliance issues are occurring so that these issues are promptly addressed.

16. The method of claim 1 wherein the answers provide a predictive measure to identify employees to be considered for further development and/or promotion as well as to identify employees likely to leave the organization.

17. A method for integrating employee feedback with a login on a point-of-sale (POS) system by an employee, the method comprising:

presenting the employee with a survey on a display screen of the POS system each time that he/she utilizes the login on the POS system, the survey including one or more survey questions directed to the employee and his/her work with an organization, his/her level of engagement with the organization, quality of programming of the organization, and possible improvements to the organization, the login having a mechanism for an employee to input a unique employee identification (ID), the mechanism selected from the group comprising: a card having an RFID chip containing the unique employee ID, a card having a magnetic strip containing the unique employee ID, and a log-in screen prompting the employee to input the unique employee ID;

generating one or more alerts when answers provided by the employee using the display screen in response to the one or more survey questions identify immediate feedback from the employee through the same display screen used for the login on the POS system by the employee about perceived discrimination, harassment, and/or illegal pay practices in the organization;

sending the one or more alerts to one or more persons within the organization associated with the employee and his/her work with the organization, wherein the one or more alerts create management action to improve key performance indicators (KPIs) associated with employees in the organization; and changing or targeting subsequent survey questions to the employee based on one or more factors including time in position, answers to previous survey questions, level of engagement, and branch/location performance.

* * * * *